US006753384B2

(12) United States Patent
Whitehouse et al.

(10) Patent No.: US 6,753,384 B2
(45) Date of Patent: Jun. 22, 2004

(54) POLYURETHANES OBTAINED FROM HYDROXYALKANOATES AND ISOCYANATES

(75) Inventors: Robert S. Whitehouse, Lexington, MA (US); Sean Daughtry, Roxbury, MA (US); Luhua Zhong, Woburn, MA (US)

(73) Assignee: Metabolix, Inc., Cambridge, MA (US)

( * ) Notice: Subject to any disclaimer, the term of this patent is extended or adjusted under 35 U.S.C. 154(b) by 0 days.

(21) Appl. No.: 09/905,156

(22) Filed: Jul. 13, 2001

(65) Prior Publication Data

US 2002/0035231 A1 Mar. 21, 2002

Related U.S. Application Data

(60) Provisional application No. 60/225,902, filed on Aug. 17, 2000, and provisional application No. 60/218,384, filed on Jul. 14, 2000.

(51) Int. Cl.[7] .............................................. C08G 18/28
(52) U.S. Cl. ...................... 525/415; 525/450; 525/938; 528/80; 528/85; 528/904
(58) Field of Search ................................. 525/415, 450, 525/938; 528/80, 85, 904

(56) References Cited

U.S. PATENT DOCUMENTS

| | | | | |
|---|---|---|---|---|
| 4,132,839 A | * | 1/1979 | Marans ........................ | 521/159 |
| 4,223,119 A | * | 9/1980 | Koleske ........................ | 528/66 |
| 4,324,880 A | | 4/1982 | Dhein et al. .................. | 528/80 |
| 4,826,493 A | | 5/1989 | Martini et al. ............... | 604/327 |
| 4,876,331 A | | 10/1989 | Doi ............................ | 528/361 |
| 4,880,592 A | | 11/1989 | Martini et al. ............... | 264/514 |
| 4,910,145 A | | 3/1990 | Holmes et al. .............. | 435/259 |
| 5,245,023 A | | 9/1993 | Peoples et al. ............. | 536/23.2 |
| 5,250,430 A | | 10/1993 | Peoples et al. ............. | 435/232 |
| 5,286,842 A | | 2/1994 | Kimura ....................... | 528/354 |
| 5,292,860 A | | 3/1994 | Shiotani et al. ............. | 528/361 |
| 5,352,763 A | * | 10/1994 | Yamaguchi ................. | 528/361 |
| 5,461,139 A | | 10/1995 | Gonda et al. ............... | 528/361 |
| 5,480,794 A | | 1/1996 | Peoples et al. ............. | 435/232 |
| 5,512,669 A | | 4/1996 | Peoples et al. ............. | 536/23.2 |
| 5,516,883 A | | 5/1996 | Hori et al. .................. | 528/354 |
| 5,534,432 A | | 7/1996 | Peoples et al. .......... | 435/240.4 |
| 5,563,239 A | | 10/1996 | Hubbs et al. ............... | 528/361 |
| 5,665,831 A | * | 9/1997 | Neuenschwander ......... | 525/415 |
| 5,859,135 A | | 1/1999 | Doomen et al. ............ | 525/123 |
| 6,034,149 A | | 3/2000 | Bleys et al. ................. | 521/155 |
| 6,043,292 A | | 3/2000 | Huygens et al. ............ | 521/133 |
| 6,087,409 A | | 7/2000 | Naber et al. ................ | 521/155 |
| 6,087,410 A | | 7/2000 | Falke et al. ................. | 521/174 |
| 6,087,466 A | | 7/2000 | Murata et al. ............... | 528/83 |
| 6,228,969 B1 | * | 5/2001 | Lee ............................. | 528/80 |
| 6,372,876 B1 | * | 4/2002 | Kim ............................ | 528/71 |

FOREIGN PATENT DOCUMENTS

| | | | |
|---|---|---|---|
| WO | 94/03510 | * | 2/1994 |
| WO | 98/55527 | * | 12/1998 |
| WO | 197 23 895 A1 | | 12/1998 |

OTHER PUBLICATIONS

International Search Report dated Jun. 27, 2002.
Abe et al., *Biosynthesis from gluconate of a random copolyester consisting of 3–hydroxy–butyrate and medium–chain–length 3–hydroxyalkanoates by Pseudomonas sp. 61–3*, Int. J. Biol. Macromol., vol. 16, pp. 36, 38, 40, (1994).
Amos et al., *Composition of poly–β–hydroxyalkanoate from Syntrophomonas wolfei grown on unsaturated fatty acid substrates*, Archives of Microbiology, pp. 103–105, (1991).
Borgne et al., *Stereoelective polymerization of β–butyrolactone*, Polymer, vol. 30, pp. 2312–2319, (Dec. 1989).
Brandl et al., *Abilityof the phototrophic bacterium Rhodospiillum rubrum to produce various poly (β–hydroxyalkanoates): potential sources for biodegradable polyesters*, Int. J. Biol. Macromol., vol. 11, pp. 49–55, (1989).
Byrom, D. *Miscellaneous Biomaterials*, ICI BioProducts and Fine Chemicals, pp. 335–359.
de Smet et al., *Characterization of Intracellular Inclusions Formed by Pseudomonas oleovorans During Growth on Octane*, Journal of Bacteriology, p. 870–878 (May 1983).
Dubois et al., *Macromolecular Engineering of Polylactones and Polylactides*, Macromolecules, pp. 4407–4412, (1993).
Gross et al., *Polymerization of β–Monosubstituted–β–propiolactones Using Trialkylaluminum–Water Catalytic Sytems and Polymer Characterization*, Macromolecules, pp. 2657–2668, (1988).
Hocking et al., *Biopolyesters*, pp. 48–96.
Hocking et al., *Syndiotactic poly[(R,S)–β–hydroxybutyrate] isolated from methylaluminoxane–catalyzed polymerization*, Polymer Bulletin, vol. 30, pp. 163–170 (1993).
Hori et al., *Ring–Opening Copolymerization of Optically Active β–Butyrolactone with Several Lactones Catalyzed by Distannoxane Complexes: Synthesis of New Biodegradable Polyesters*, Macromolecules, vol. 26, pp. 4388–4390 (1993).
Hori et al., *Ring–Opening Polymerization of Optically Active β–Butyrolactone Using Distannoxane Catalysts: Synthesis of High Molecular Weight Poly(3–hydroxybutyrate)*, Macromolecules, vol. 26, pp. 5533–5534 (1993).
Jesudason et al., *Synthetic Poly[(R, S)–β–hydroxyalkanoates] with Butyl and Hexyl Side Chains*, Macromolecules, vol. 27, pp. 2595–2602 (1994).

(List continued on next page.)

Primary Examiner—Patricia A. Short
(74) Attorney, Agent, or Firm—Kilyk & Bowersox, P.L.L.C.

(57) ABSTRACT

A polyurethane is described which is a reaction product of at least one isocyanate containing material having at least two isocyanate groups and at least one compound having at least two hydrogen atoms capable of reacting with the isocyanate. The compound having the at least two hydrogen atoms contains a hydroxyalkanoate, which is preferably a thermally decomposable or a biodegradable polyhydroxyalkanoate. The polyurethane of the present invention can be used in a number of applications and preferably has improved properties such as, but not limited to, improved flexibility and/or improved hydrophobicity. The polyurethanes of the present invention are preferably biodegradable and easily recycled.

23 Claims, No Drawings

OTHER PUBLICATIONS

Kato et al., *Production of a novel copolyester of 3–hydroxybutyric acid and medium–chain–length 3–hydroxyalkanoic acids by Pseudomonas sp. 61–3 from sugars, Applied Microbiology and Biotechnology*, pp. 363–370, (1996).

Kemnitzer, *Preparation of Predominantly Syndiotactic Poly (β–hydroxybutyrate)by the Tributyltin Methoxide Catalyzed Ring–Opening Polymerization of Racemic β–Butyrolactone, Macromolecules*, vol. 26, pp. 1221–1229, (1993).

Kharas et al., *Polymers of Lactic Acid* 94–137 (No date available).

Lafferty et al., *Microbial Production of Poly–β–hydroxybutyric Acid*, Chapter 6, pp. 137–176.

Lee et al., *Biosynthesis of copolyesters consisting of 3–hydroxybutyric acid and medium–chain–length 3–hydroxyalkanoic acids from 1,3–butanediol or from 3–hydroxybutyrate by Pseudomonas sp. A33, Applied Microbiology and Biotechnology*, pp. 901–909, (1995).

Muller et al., *Poly(hydroxyalkanoates): A Fifth Class of Physiologically Important Organic Biopolymers?, Angew, Chem. Int. Ed. Engl.*, vol. 32, pp. 477–502 (1993).

*Reports on Progress in Polymer Physics in Japan*, vol. 37, pp. 128–129 (1994).

Steinbuchel et al., *A Pseudomonas strain accumulating polyesters of 3–hydroxybutyric acid and medium–chain–length 3–hydroxyalkanoic acids Applied Microbiology and Biotechnology*, pp. 691–697 (1992).

Tanahashi et al., *Thermal Properties and Stereoregularity of Poly(3–hydroxybutyrate)Prepared from Optically Active β–Butyrolactone with a Zinc–Based Catalyst, Macromolecules*, vol. 24, pp. 5732–5733 (1991).

Valentin et al., *Identification of 4–hydroxyhexanoic acid as a new constituent of biosynthetic polyhydroxyalkanoic acids from bacteria, Applied Microbiology and Biotechnology*, pp. 710–716, (1994).

Valentin et al., *Identification of 4–hydroxyvaleric acid as a constituent of biosynthetic polyhydroxyalkanoic acids from bacteria, Applied Microbiology and Biotechnology*, pp. 507–514, (1992).

Valentin et al., *Identification of 5–hydroxyhexanoic acid, 4–hydroxyheptanoic acid and 4–hydroxyoctanoic acid as new constituents of bacterial polyhydroxyalkanoic acids, applied Microbiology and Biotechnology*, pp. 261–267, (1996).

Wallen et al., *Poly–β–hydroxyalkanoate from Activated Sludge, Environmental Science & Technology*, vol. 8, pp. 576–579, (Jun. 1974).

Xie et al., *Ring–Opening Polymerization of β–Butyrolactone by Thermophilic Lipases, Macromolecules*, vol. 30, pp. 6997–6998 (1997).

\* cited by examiner

POLYURETHANES OBTAINED FROM HYDROXYALKANOATES AND ISOCYANATES

This application claims the benefit under 35 U.S.C. § 119(e) of prior U.S. Provisional Patent Application Nos. 60/218,384 filed Jul. 14, 2000 and 60/225,902 filed Aug. 17, 2000, which are incorporated in their entirety by reference herein.

BACKGROUND OF THE INVENTION

The present invention relates to polyurethanes and to products containing or formed from polyurethanes, such as foams, elastomers, adhesives, coatings, textiles, and the like.

In general, the raw materials for preparing polyurethanes are polyisocyanates, polyols, diamines, catalysts, additives, and blocking agents. The polyisocyanates are either aliphatic, like hexamethylene diisocyanates, isophorone diisocyanate, and 4,4'-diisocyanate dicyclo hexylmethane, or the polyisocyanates can be aromatic, like 2,4-toluene diisocyanate, 1,5-naphthalene diisocyanate, and 4,4'-methylene diphenyl diisocyanate. The polyols are typically polyethers, such as propylene glycol and trimethylolpropane combined with sucrose or polyesters, or ethylene glycol, 1,2-propanediol, 1,4-butenediol, and diethylene glycol combined with glycerol. Polyethers are typically used to produce flexible and rigid foams and polyesters are typically used to produce elastomers, flexible foams, and coatings. Lewis acids and Lewis bases are typically used as catalysts. Additives, which can be present, are typically polysiloxane-polyether, carbodiamide piperazine, chloro-fluoro-hydrocarbons, and phosphorous and nitrogen containing compounds.

U.S. Pat. No. 4,324,880 to Dhein et al. describes the formation of a lacquer from the transesterification reaction of PHB with a polyhydroxycompound such a trimethylol propane or pentaerythritol in the presence of dibutyl tin oxide to produce a reaction product having a hydroxyl number between 50 and 400. No description of the reaction product is given. However, because an excess of PHB was used relative to the polyhydroxycompound, one would expect that the resultant product is predominantly the n-ester, where n is the number of hydroxyl groups present in the polyhydroxy compound. Because the reaction product is ill defined one could expect significant variability in the final lacquer product.

U.S. Pat. No. 5,352,763 to Yamaguchi et al. describes the formation of an oligomer having the general structure $(ABA)_n$ X where A is a polyhydroxyalkanoate oligomer and B is a difunctional coupling agent and X is a di-isocyanate compound. Reaction conditions are similar to those described in U.S. Pat. No. 4,324,880 with the reactants being the alkylester of the (R) 3-hydroxyalkanoate and a smaller molar contribution of the diol "B" coupling agent.

U.S. Pat. No. 5,665,831 to Neuenschwander et al. describes biodegradable block copolymers containing two distinct copolymer blocks. One of the copolymer blocks is obtained from the transesterification of poly (R) 3 hydroxy-butyrate (or poly (R) 3 hydroxybutyrate co (R) 3 hydroxyvalerate) with ethylene glycol using similar reaction conditions described in U.S. Pat. Nos. 4,324,880 and 5,352,763.

In all three patents, the descriptions indicate that the resulting diol ester contains terminal secondary hydroxyl groups on the chiral carbon atoms from the (R) hydoxyal-kanoate moiety. Because both terminal hydroxyl groups have the same reactivity, i.e., secondary hydroxyl group, then subsequent reactions with for instance, an isocyanate group will occur with equal frequency at both ends of the oligomer.

In the present invention, the hydroxyl terminated hydroxyalkanoate derivatives preferably have hydroxyl terminal groups with different functionalities. This significantly changes the subsequent reaction methodology when combined with polyisocyanate molecules to form polyurethanes. By modifying the reaction conditions, the present invention generates unique polyurethane structures with enhanced physical properties.

While there are a variety of polyurethanes available, there is a need to form polyurethanes which have the capability of being biodegradable or can be easily recycled. In addition, there is a need to provide polyurethanes which preferably have improved flexibility and/or improved hydrophobicity.

SUMMARY OF THE PRESENT INVENTION

A feature of the present invention is to provide polyurethanes which are biodegradable.

Another feature of the present invention is to provide polyurethanes which can be recycled.

A further feature of the present invention is to provide polyurethanes having improved physical properties, such as improved flexibility and/or improved hydrophobicity.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages, and in accordance with the purposes of the present invention, as embodied and broadly described herein, the present invention relates to a polyurethane obtained by the reaction of at least one isocyanate containing material and at least one compound having at least two hydrogen atoms and capable of reacting with isocyanate groups, such as a hydroxyl-containing material, wherein the compound contains a thermally decomposable or a biodegradable hydroxyalkanoate. The hydroxyl-containing material preferably has hydroxyl terminal groups with different functionalities.

The present invention further relates to foams, elastomers, coatings, adhesives, and textiles containing the above-described polyurethane.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to polyurethanes and products made from or containing polyurethanes. The present invention also relates to methods of making polyurethanes.

For purposes of the present invention, the polyurethane can be a polyurethane obtained by the reaction of a) at least one isocyanate containing material and b) at least one compound containing at least two hydrogen atoms and capable of reacting with isocyanate groups. The compound containing at least two hydrogen atoms contains, as part of the compound, a biodegradable or a thermally decomposable hydroxyalkanoate. As a result, the polyurethane is preferably at least partially biodegradable and/or thermally decomposable.

For purposes of the present invention, the polyurethane of the present invention can be linear or cross-linked. The polyurethane can be any type of polyurethane such as, but not limited to, castable, millable, thermoplastic, cellular, sprayable, poromeric (e.g., porous), fibrous, and the like. These various types of polyurethanes can be formed using the components of the present invention along with the knowledge of those skilled in the art with respect to making these particular types of polyurethanes. For instance, a linear polyurethane is typically prepared by reacting a hydroxyl-containing group with an aliphatic diisocyanate. Castable polyurethanes are typically obtained by extending hydroxyl-containing compounds with diisocyanate to yield an isocyanate-terminated prepolymer. Glycol or diamine chain extenders can then be used to bring about further chain extension. Typically, a slight excess of diisocyanate is normally employed and this enables the crosslinking to occur at the urethane or urea group.

The molecular weight of the polyurethane can be any molecular weight and depends upon the products used to form the polyurethane. Strictly as an example, the molecular weight of the polyurethane can be from about 20,000 to about 200,000. Other molecular weight ranges can be obtained.

The isocyanate containing material can typically be a polyisocyanate. Preferably, the isocyanate containing material contains at least two isocyanate groups per molecule. The polyisocyanates can be any polyisocyanate traditionally used in the formation of polyurethanes. These polyisocyanates can be modified or unmodified versions. Preferably, the polyisocyanate is an aromatic polyisocyanate. A more specific example would be a toluene diisocyanate or mixtures containing toluene diisocyanate. The isocyanates can also be modified by other components, such as urethane, allophanate, uretdione, or other groups. The isocyanates described earlier can also be used. The isocyanate component is preferably a toluene diisocyanate, methylene 4,4' diphenyl diisocyanate, isophorone diisocyanate, hexamethylene diisocyanate, or combinations thereof. Generally, the amount of isocyanate used would be the same as in the conventional making of polyurethanes. Examples of amounts are from about 5 to about 50% by weight of total reactants.

With respect to the compound containing at least two hydrogen atoms and also containing a thermally decomposable or a biodegradable hydroxyalkanoate, this compound is capable of reacting with an isocyanate. Thermally decomposable includes the property wherein the hydroxyalkanoate breaks down molecularly at temperatures of about 200° C. or higher. Preferably, the compound is a hydroxyl-containing material having at least two hydroxyl groups. More preferably, the compound is a polyol compound such as 4 hydroxy butyl (3 hydroxybutyrate) and butyl bis (3 hydroxyoctanoate). As indicated, the compound which reacts with the isocyanate has a hydroxyalkanoate as part of the compound. Preferably, from about 5% to about 100% by weight of the compound contains the hydroxyalkanoate, which is preferably a polyhydroxyalkanoate. The polyhydroxyalkanoate can be synthetic or prepared by other means, such as by biosynthesis. Biosynthesis methods are preferred due to the product having chiral(s).

Several types of polyhydroxyalkanoates (PHAs) are known. It is useful to broadly divide the PHAs into two groups according to the length of their side chains and according to their pathways for biosynthesis. Those with short side chains, such as polyhydroxybutyrate (PHB), a homopolymer of R-3-hydroxybutyric acid units, are crystalline thermoplastics; PHAs with long side chains are more elastomeric. The former polymers have been known for about seventy years (Lemoigne & Roukhelman 1925), while the latter polymers are a relatively recent discovery (deSmet, et al., *J. Bacteriol.*, 154:870–78 (1983)). Before this designation, however, PHAs of microbial origin containing both R-3-hydroxybutyric acid units and longer side chain units from C5 to C16 were identified (Wallen & Rowheder, *Environ. Sci. Technol.*, 8:576–79 (1974)). A number of bacteria which produce copolymers of D-3-hydroxybutyric acid and one or more long side chain hydroxyacid units containing from five to sixteen carbon atoms have been identified more recently (Steinbuchel & Wiese, *Appl. Microbiol. Biotechnol*, 37:691–97 (1992); Valentin et al., *Appl. Microbiol. BiotechnoL*, 36:507–14 (1992); Valentin et al., *AppL. Microbiol. BiotechnoL*, 40:710–16 (1994); Abe et al., *Int. J. Biol. Macromol.*, 16:115–19 (1994); Lee et al., *AppL. Microbiol. Biotechnol.*, 42:901–09 (1995); Kato et al., *Appl. Microbiol. Biotechnol.*, 45:363–70 (1996); Valentin et al., *Appl Microbiol. Biotechnol.*, 46:261–67 (1996); U.S. Pat. No. 4,876,331 to Doi). Useful examples of specific two-component copolymers include PHB-co-3-hydroxyhexanoate(Brandl et al., *Int. J. Biol. Macromol.*, 11:49–55 (1989); Amos & McInerey, *Arch. Microbiol.*, 155:103–06 (1991); U.S. Pat. No. 5,292,860 to Shiotani et al.). Chemical synthetic methods have also been applied to prepare racemic PHB copolymers of this type for applications testing (WO 95/20614, WO 95/20615, and WO 96/20621).

For purposes of the present invention, the molecular weight of the PHAs is from about 100 to about 2 million Daltons, and more preferably from about 500 to about 750,000 Daltons. The PHAs can contain one or more units of the following formula:

—OCR$^1$R$^2$(CR$^3$R$^4$)$_n$CO— wherein n is 0 or an integer of from 1 to 20,000 or more; and wherein R$^1$, R$^2$, R$^3$, and/or R$^4$ are independently selected from saturated and unsaturated hydrocarbon radicals, halo- and hydroxy- substituted radicals, hydroxy radicals, halogen radicals, nitrogen-substituted radicals, oxygen-substituted radicals, and hydrogen atoms. Preferably n is from 0 to 5 and more preferably from 1 to about 3. Examples of R$^1$, R$^2$, R$^3$ and/or R$^4$ include, but are not limited to, hydrogen, methyl, ethyl, propyl, butyl, pentyl, hexyl, heptyl, octyl, nonyl, decyl, and the like.

Suitable monomeric units include hydroxybutyrate, hydroxyvalerate, hydroxyhexanoate, hydroxyheptanoate, hydroxyoctanoate, hydroxynonanoate, hydroxydecanoate, hydroxyundecanoate, and hydroxydodecanoate units. PHAs, including monomers and polymers and derivatives of 2-hydroxyacids, 3-hydroxyacids, 4-hydroxyacids, 5-hydroxyacids, p-lactic acid, and p-glycolic acid, can be used. Representative PHAs are described in Steinbtuchel & Valentin, *FEMS Microbiol Lett.*, 128:219-$_{28}$ (1995).

Preferred PHAs include, but are not limited to, homopolymers of PHAs, polyhydroxybutyrate; a copolymer of hydroxybutyric acid and hydroxyvaleric acid (e.g., a copolymer of 60–99 weight % hydroxy butyric acid and 1–40 weight % hydroxyvaleric acid); a copolymer of 3-hydroxybutyric acid and 4-hydroxybutyric acid; polyhydroxyoctanoate; a copolymer of 4-hydroxybutyric and 4-hydroxyhexanoic acid; a copolymer of 4-hydroxybutyric acid and 4-hydroxyoctanoic acid; a copolymer of 3-hydroxyoctanoic acid with 3-hydroxybutryic acid; a copolymer of 3-hydroxyhexanoic acid and 3-hydroxybutyric acid; a copolymer containing hydroxyoctonate groups randomly distributed through the polymer chain (e.g., at least 10% by molar mass hydroxyoctanoate groups randomly distributed through the polymer chain of a copolymer); and combinations thereof. The polyhydroxyalkanoate can also have end chain functionalities such as groups selected from vinyl; carboxylic acid; carboxylic acid ester; acetate; butyrate; propanoate; primary, secondary, or tertiary alcohol; amide; and/or a polyhydric alcohol.

The PHA can also have the formula $RCH=CH_2(CH_2)_{n-1}CO\ [OCHR(CH_2)_n\ CO]_pOH$. Alternatively, the PHA can have the formula $H[OCHR(CH_2)_n\ CO]_pOR'$. Further, the PHA can have the formula $R''CO[OCHR(CH_2)_n\ CO]_pOH$. The PHA can also be a block polymer containing polyhydroxyalkanoate segments and at least one polyalkylene glycol segment. Preferably, for such a PHA, the block polymer preferably contains at least 20 weight % of a PHA segment and at least one polyalkylene glycol segment selected from one or more repeat units of ethylene oxide, propylene oxide, butylene oxide, or mixtures thereof. In the above formulas, p is from 1 to 1000, more preferably 2 to 1000 or 5 to 1000, R is H, $CH_3$, $C_2H_5$, or is $C_3H_7$, $C_4H_9$, $C_5H_7$, R' is Methyl-styryl, and R" is methyl-styryl.

The PHAs can be prepared from a biological source such as a microorganism which naturally produces the PHAs or which can be induced to produce the PHAs by manipulation of culture conditions and feedstocks, or microorganisms or a higher organism such as a plant, which has been genetically engineered so that it produces PHAs.

Methods which can be used for producing PHA polymers from microorganisms which naturally produce polyhydroxyalkanoates are described in U.S. Pat. No. 4,910,145 to Holmes, et al.; Byrom, "Miscellaneous Biomaterials" in *Biomaterials* (Byrom, ed.) pp. 333–59 (MacMillan Publishers, London 1991); Hocking and Marchessault, "Biopolyesters" in *Chemistry and Technology of Biodegradable Polymers* (Griffin, ed.) pp. 48–96 (Chapman & Hall, London 1994); Holmes, "Biologically Produced (R)-3-hydroxyalkanoate Polymers and Copolymers" in Developments in *Crystalline Polymers* (Bassett, ed.) vol. 2, pp. 1–65 (Elsevier, London 1988); Lafferty et al., "Microbial Production of Poly-b-hydroxybutyric acid" in *Biotechnology* (Rehm & Reed, eds.) vol. 66, pp. 135–76 (Verlagsgesellschaft, Weinheim 1988); Müller & Seebach, *Angew. Chem. Int. Ed. Engl.* 32:477–502 (1993). All patents, patent applications, and publications mentioned here and throughout this application are incorporated herein in their entirety by reference.

Methods for producing PHAs in natural or genetically engineered organisms are described by Steinbuchel, "Polyhydroxyalkanoic Acids" in *Biomaterials* (Byrom, ed.) pp. 123–213 (MacMillan Publishers, London 1991); Williams & Peoples, *CHEMTECH*, 26:38–44 (1996); Steinbüchel & Wiese, *Appl. Microbiol Biotechnol.*, 37:691–97 (1992); U.S. Pat. Nos. 5,245,023; 5,250,430; 5,480,794; 5,512,669; 5,534,432 to Peoples and Sinskey; Agostini et al., *Polym. Sci.*, Part A-1, 9:2775–87 (1971); Gross et al., *Macromolecules*, 21:2657–68 (1988); Dubois, et al., *Macromolecules*, 26:4407–12 (1993); Le Borgne & Spassky, *Polymer*, 30:2312–19 (1989); Tanahashi & Doi, *Macromolecules*, 24:5732–33 (1991); Hori et al., *Macromolecules*, 26:4388–90 (1993); Kemnitzer et al., *Macromolecules*, 26:1221–29 (1993); Hori et al., *Macromolecules*, 26:5533–34 (1993); Hocking & Marchessault, *Polym. Bull.*, 30:163–70 (1993); Xie et al., *Macromolecules*, 30:6997–98 (1997); and U.S. Pat. No. 5,563,239 to Hubbs et al. Other polymer synthesis approaches including direct condensation and ring-opening polymerization of the corresponding lactones are described in Jesudason & Marchessault, *Macromolecules* 27:2595–602 (1994); U.S. Pat. No. 5,286,842 to Kimura; U.S. Pat. No. 5,563,239 to Hubbs et al.; U.S. Pat. No. 5,516,883 to Hori et al.; U.S. Pat. No. 5,461,139 to Gonda et al.; and Canadian Patent Application No. 2,006,508. WO 95/15260 describes the manufacture of PHBV films, and U.S. Pat. Nos. 4,826,493 and 4,880,592 to Martini et al. describe the manufacture of PHB and PHBV films. U.S. Pat. No. 5,292,860 to Shiotani et al. describes the manufacture of the PHA copolymer poly(3-hydroxybutyrate-co-3-hydroxyhexanoate).

Preferably, the hydroxyalkanoate which forms part of the compound has one of the following formulas:

a) $HOCHR(CH_2)_yCOO\ A\ OH$ wherein R is hydrogen, a saturated alkyl group having from 1 to 16 carbon atoms or an unsaturated alkyl group having from 2 to 16 carbon atoms or mixtures thereof. A is $(CH_2)_n$ where n is 2 to 6 or A is $(CH_2CHR'O)_m$ where R' is hydrogen or methyl, m is from 1 to 50 and y is 0 to 3;

b) $H\{OCHR(CH_2)_yCO\}_xO\ A\ OH$ wherein R is hydrogen, a saturated alkyl group having from 1 to 16 carbon atoms or an unsaturated alkyl group having from 2 to 16 carbon atoms or mixtures thereof. A is $(CH_2)_n$ wherein n is 2 to 6 or A is $(CH_2CHR'O)_m$ where R' is hydrogen or methyl, m is from 1 to 50, y is 0 to 3, and x is 2 to 1000;

c) $HOCHR(CH_2)_yCOO\ A\ OOC\ (CH_2)_y\ CHROH$ wherein R is hydrogen, a saturated alkyl group having from 1 to 16 carbon atoms or an unsaturated alkyl group having from 2 to 16 carbon atoms or mixtures thereof. A is $(CH_2)_n$ where n is 2 to 6 or A is $(CH_2CHR'O)_m$ where R' is hydrogen or methyl, m is from 1 to 50, and y is 0 to 3;

d) $H\{OCHR(CH_2)_yCO\}_x\ O\ A\ O\ \{OC(CH_2)_yCHRO\}_xH$ wherein R is hydrogen, a saturated alkyl group having from 1 to 16 carbon atoms or an unsaturated alkyl group having from 2 to 16 carbon atoms or mixtures thereof. A is $(CH_2)_n$ where n is 2 to 6 or A is $(CH_2CHR'O)_m$ where R' is hydrogen or methyl, m is from 1 to 50, y is 0 to 3, and x is 2 to 1000;

e) $\{HOCHR(CH_2)_yCO\}_z\ B$ wherein R is hydrogen, a saturated alkyl group having from 1 to 16 carbon atoms or an unsaturated alkyl group having from 2 to 16 carbon atoms or mixtures thereof, y is 0 to 3 and B is selected from:

trimethylol propane and z is 1, 2 or a mixture of 1 and 2;

glycerol where z is 1, 2 or a mixture of 1 and 2;

triethanolamine where z is 1, 2 or a mixture of 1 and 2; or sucrose where z is 1 to (p-1) wherein p is the number of free hydroxyl groups or derivatives on the compound containing at least two hydrogen atoms; and/or f) $[H\{OCHR(CH_2)_yCO\}_x]_z\ B$ wherein R is hydrogen, a saturated alkyl group having from 1 to 16 carbon atoms or an unsaturated alkyl group having from 2 to 16 carbon atoms or mixtures thereof, y is 0 to 3, and x is 2 to 1000. B is selected from:

trimethylol propane and z is 1, 2 or a mixture of 1 and 2;

glycerol where z is 1, 2 or a mixture of 1 and 2;

triethanolamine where z is 1, 2 or a mixture of 1 and 2; or sucrose where z is 1 to (p-1) wherein p is the number of free hydroxyl groups or derivatives on the compound containing at least two hydrogen atoms.

The numbers above for x, m, n, p, y, z are integers. When there is more than one R or other variable present in a formula, the R or variable can be the same or different. Preferably, the hydroxyalkanoate is a 3 hydroxy butyric acid combined with ethylene glycol, 1,3 propane diol, 1,2 propane diol, 1,2 butane diol, 1,3 butane diol, and/or 1,4 butane diol. Alternatively, the hydroxyalkanoate can be a 3 hydroxy butyric acid combined with polyethylene glycol, for example, 1,2 propylene glycol or 1,3 propylene glycol, and preferably having from about 1 to about 100 ethylene glycol repeating units. The hydroxyalkanoate can also be a mixture of various hydroxy alkanoates such as a mixture of 3 hydroxy butyric acid and 3 hydroxy valeric acid combined with ethylene glycol, 1,3 propane diol, 1,2 propane diol, 1,2 butane diol, 1,3 butane diol, 1,4 butane diol, or propylene glycol preferably having from about 1 to about 100 ethylene glycol repeating units. The bis (hydroxy acid esters), for instance, those set forth in c) and d) above, can be formed from 2 moles of hydroxy acid reacting with one mole of diol.

Generally, the weight ratio of isocyanate to the compound having at least two hydrogen atoms is from about 0.5:1 to about 2:1.

In making the polyurethanes of the present invention, at least one catalyst is preferably used in the reaction. Conventional catalysts used for the making of polyurethanes can be used in the present invention. For instance, such catalysts include, but are not limited to, tertiary amines, such as triethylamine, dimethylcyclohexylamine, or diazobicyclo [2.2.2.]octane. Conventional amounts of catalysts can be used in the present invention.

One or more blowing agents can additionally be used in the formation of the polyurethanes, if desired. Blowing agents activated chemically or by mechanical means can be used in the present invention. Conventional blowing agents can be used, such as water and low-boiling inert liquids, such as hydrocarbons. Preferably, the blowing agent is a pentane such as a cyclopentane or can be combinations of various blowing agents. The blowing agent can be used in conventional amounts.

Other additives customary to polyurethane formulations can be used in the present invention including, but not limited to, flame retardants, foam stabilizers, fillers, antioxidants, pigments, and the like. These various additives can be used in conventional amounts, if present. The reaction conditions and various components and amounts that can be present in the present invention are described in a variety of U.S. Pats, including, but not limited to, U.S. Pat. Nos. 6,087,466; 6,087,410; 6,043,292; 6,034,149; and 6,087,409, all of which are incorporated in their entirety by reference herein.

In making the polyurethanes of the present invention, the reactants can simply be mixed together under ambient conditions with low shear or high shear mixing. The reaction can occur in minutes or in hours depending on temperature and the optional use of catalyst.

In one embodiment, the PHA, such as poly 3-hydroxybutyrate can be reacted with polyol. Preferably, about 2 to 3 molar excess of polyol (based on the hydroxyalkonate monomer repeat unit) required to produce the monoester is used. The molar excess drives the reaction towards the monoester formation with little or no diester product.

As another example, for conversion to the diol ester from methyl 3 hydroxybutyrate, molar equivalents, (e.g., 0.98 mol % of diol) can be used to again drive the reaction to monoester formation. Accordingly, in one embodiment of the present invention, monoester formation is preferred, wherein little (e.g., less than 10% of yield and more preferably less than 5% yield or even less than 1% yield) or no diester formation occurs in the reaction product. This reaction product can then be reacted with at least one isocyante using known conditions to form a polyurethane.

The polyurethane can have a number of different properties. The polyurethane can be biodegradable and can be recycled. The polyurethane can be hydrophilic or hydrophobic. Further, the polyurethane can be used in a number of applications, including, but not limited to, coatings, foams (including rigid and flexible), elastomers, dispersions, and other water dispersible applications. The polyurethane can be formed into a number of articles, such as pipes, insulation, and any other articles traditionally formed from polyurethane materials such as dash boards, other automobile components, and the like. These various applications can be accomplished using conventional techniques known to those skilled in the art in view of the present application.

The present invention will be further clarified by the following examples, which are intended to be purely exemplary of the invention.

EXAMPLES

Example 1

Production of mono ethylene glycol ester of (R) 3 hydroxybutyrate HO CH (CH3) CH2 COO CH2 CH2 OH 1300 mL of Ethylene Glycol (EG) was charged in a 3 L three neck flask. 430 g of Poly-R-3-Hydroxybutyrate (P3HB) was added while stirring with an overhead stirrer. An additional 200 mL of EG was added to help wet out all the polymer. 15 mL of $H_2SO_4$ conc. with 15 mL of $H_2O$ were added dropwise. The mixture was heated to 120° C. with a temperature controller. The reaction was monitored by GC. The desired ester formation occurred after 120–140 hours. After the reaction was completed, the product was cooled to room temperature. The acid product was slowly neutralized with $NaHCO_3$ or $Na_2CO_3$ and was filtered to remove all solids and salts. The product was then rotovapped to remove all 'lights' (dioxane). The product was then distilled to separate the product/EG azeotrope from the heavies The product was extracted from the distillate with EtOAc and water. The product was then distilled for final purification.

Example 2

Production of mono ethylene glycol ester of (R) 3 hydroxybutyrate HO CH (CH3) CH2 COO CH2 CH2 OH 61 g of ethylene Glycol (EG) and 101 g of methyl (R) 3 hydroxybutyrate were charged in a 500 ml three neck flask. 1 ml of $H_2SO_4$ conc. with 2 ml of $H_2O$ were added dropwise. The mixture was then heated under reflux to remove methanol. The yield was 97% mono ethylene glycol ester of (R) 3 hydroxybutyrate.

Example 3

Production of mono glycerol ester of (R) 3 hydroxybutyrate HO CH (CH3) CH2 COO CH2 CH (OH) CH2 OH 91 g of glycerol and 101 g of methyl (R) 3 hydroxybutyrate were charged in a 500 ml three neck flask. 1 ml of $H_2SO_4$ conc. with 2 ml of $H_2O$ were added dropwise. The mixture was then heated under reflux to remove methanol. The yield was 98% mono glycerol of (R) 3 hydroxybutyrate.

Example 4

Production of diethanolamide ester (R) 3 hydroxybutyrate HO CH (CH3) CH2 CONH (CH2 CH2 OH)2

78 g of diethanolamine and 101 g of methyl (R) 3 hydroxybutyrate were charged in a 500 ml three neck flask. The mixture was then heated under reflux to remove methanol. The yield was 98% diethanolamide ester of (R) 3 hydroxybutyrate.

The reaction products of each of Examples 1–4 can then be reacted with a desired isocyante(s) under conventional reaction conditions and amounts as specified above to form the polyurethanes of the present invention.

Other embodiments of the present invention will be apparent to those skilled in the art from consideration of the present specification and practice of the present invention disclosed herein. It is intended that the present specification and examples be considered as exemplary only with a true scope and spirit of the present invention being indicated by the following claims and equivalents thereof.

What is claimed is:

1. A polyurethane obtained by the reaction of at least one product containing at least two isocyanate groups per molecule and at least one compound having at least two hydroxyl groups having different reactivity to the at least two isocyanate groups, wherein the at least one compound includes a thermally decomposable or biodegradable hydroxyalkanoate component.

2. The polyurethane of claim 1, wherein said hydroxyalkanoate is 3 hydroxybutyric acid combined with ethylene glycol 1, 3 propane diol, 1,2 propane diol, 1,3 butane diol, 1,4 butane diol, diethanolamine, or combinations thereof.

3. The polyurethane of claim 1, wherein said hydroxyalkanoate is 3 hydroxybutyric acid combined with polyethylene glycol having from about 1 to about 100 ethylene glycol repeat units.

4. The polyurethane of claim 1, wherein said hydroxyalkanoate is a mixture of 3 hydroxybutyric acid and 3 hydroxyvaleric acid combined with ethylene glycol, 1, 3 propane diol, 1,2 propane diol, 1,3 butane diol, 1, 4 butane diol, or combinations thereof.

5. The polyurethane of claim 1, wherein said hydroxyalkanoate is a mixture of 3 hydroxybutyric acid and 3 hydroxyvaleric acid combined with polyethylene glycol having from about 1 to about 100 ethylene glycol repeat units.

6. The polyurethane of claim 1, wherein said isocyanate containing material is toluene diisocyanate, methylene 4, 4' diphenyl diisocyanate, isophorone diisocyanate, hexamethylene diisocyanate, a combinations thereof.

7. The polyurethane of claim 1, wherein the weight ratio of isocyanate groups to hydroxy groups is from 0.5:1 to 2:1.

8. The polyurethane of claim 1, wherein the polyurethane is biodegradable.

9. The polyurethane of claim 1, wherein the polyurethane is hydrophilic.

10. The polyurethane of claim 1, wherein the polyurethane is hydrophobic.

11. The polyurethane of claim 1, wherein the polyurethane is a coating.

12. The polyurethane of claim 1, wherein the polyurethane is a flexible foam.

13. The polyurethane of claim 1, wherein the polyurethane is a rigid foam.

14. The polyurethane of claim 1, wherein the polyurethane is an elastomer.

15. The polyurethane of claim 1, wherein the polyurethane is water dispersible.

16. The polyurethane of claim 1, wherein the hydroxyalkanoate is a polymer of one or more subunits having the chemical formula:

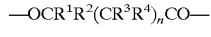

$$-OCR^1R^2(CR^3R^4)_nCO-$$

wherein n is 0 or an integer, and wherein $R^1$, $R^2$, $R^3$, and $R^4$, which are the same or different, is selected from saturated and unsaturated hydrocarbon radicals; halo- and hydroxy-substituted radicals; hydroxy radicals; halogen radicals; nitrogen-substituted radicals; oxygen-substituted radicals; or hydrogen atoms.

17. The polyurethane of claim 1, wherein said hydroxyalkanoate is a polymer.

18. The polyurethane of claim 17, wherein said polymer is a homopolymer or copolymer.

19. The polyurethane of claim 17, wherein said polymer is a copolymer of 3-hydroxybutyric acid and 4-hydroxybutyric acid.

20. The polyurethane of claim 17, wherein said hydroxyalkanoate is a polymer of 3 hydroxybutyric acid and 3 hydroxyhexanoic acid, or a polymer of 3 hydroxybutyric acid and 3 hydroxyoctanoic acid.

21. The polyurethane of claim 17, wherein said hydroxyalkanoate is a polymer of 1,3 hydroxy butyric acid; 1,4 hydroxy butyric acid, or both.

22. A method of making the polyurethane of claim 1, comprising reacting at least one product containing at least two isocyanate groups per molecule and at least one compound having at least two hydroxyl groups having different reactivity to the at least two isocyanate groups, wherein said at least one compound contains, as part of the compound, a thermally decomposable or a biodegradable hydroxyalkanoate component.

23. The method of claim 22, wherein said compound having at least two hydrogen atoms is primarily a mono ester.

* * * * *

UNITED STATES PATENT AND TRADEMARK OFFICE
CERTIFICATE OF CORRECTION

PATENT NO. : 6,753,384 B2
DATED : June 22, 2004
INVENTOR(S) : Robert S. Whitehouse, Sean Daughtry and Luhua Zhong It is certified that error appears in the above-identified patent and that said Letters Patent is hereby corrected as shown below:

Column 9,
Line 56, "a combinations thereof" should read -- or combinations thereof --.

Signed and Sealed this

Twenty-first Day of December, 2004

JON W. DUDAS
*Director of the United States Patent and Trademark Office*